(12) United States Patent
Kim (10) Patent No.: US 9,679,304 B1
(45) Date of Patent: Jun. 13, 2017

(54) ACCENTUATING TERMS OR FEATURES OF INTEREST IN AN ADVERTISEMENT

(75) Inventor: Nina Marie Kim, Mountain View, CA (US)

(73) Assignee: Google Inc., Mountain View, CA (US)

( * ) Notice: Subject to any disclaimer, the term of this patent is extended or adjusted under 35 U.S.C. 154(b) by 3489 days.

(21) Appl. No.: 10/261,294

(22) Filed: Sep. 30, 2002

(51) Int. Cl.
*G06Q 30/00* (2012.01)
*G06Q 30/02* (2012.01)

(52) U.S. Cl.
CPC ..... *G06Q 30/0241* (2013.01); *G06Q 30/0251* (2013.01); *G06Q 30/0257* (2013.01)

(58) Field of Classification Search
USPC ............................................ 705/14; 707/3, 1
See application file for complete search history.

(56) References Cited

U.S. PATENT DOCUMENTS

| | | | |
|---|---|---|---|
| 5,241,671 A | | 8/1993 | Reed et al. |
| 5,598,557 A | | 1/1997 | Doner et al. |
| 5,619,709 A | | 4/1997 | Caid et al. |
| 5,794,178 A | | 8/1998 | Caid et al. |
| 5,946,678 A | * | 8/1999 | Aalbersberg ...... G06F 17/30696 |
| 6,081,774 A | | 6/2000 | De Hita et al. |
| 6,269,361 B1 | * | 7/2001 | Davis et al. |
| 6,311,194 B1 | | 10/2001 | Sheth et al. |
| 6,332,127 B1 | | 12/2001 | Bandera et al. |
| 6,339,767 B1 | | 1/2002 | Rivette et al. |
| 6,385,592 B1 | | 5/2002 | Angles et al. |
| 6,393,253 B1 | | 5/2002 | Kitabatake |
| 6,499,026 B1 | | 12/2002 | Rivette et al. |
| 6,513,032 B1 | | 1/2003 | Sutter |
| 6,714,975 B1 | | 3/2004 | Aggarwal et al. |
| 6,778,975 B1 | * | 8/2004 | Anick ............... G06F 17/30864 707/710 |
| 6,820,237 B1 | * | 11/2004 | Abu-Hakima et al. ....... 715/531 |
| 6,836,667 B1 | * | 12/2004 | Smith, Jr. ............... H04W 4/02 455/456.1 |

(Continued)

OTHER PUBLICATIONS

Saul Hansell. Alta Vista Invites Advertisers to Pay for Top Ranking. New York Times. Apr. 15, 1999. p. C.2.*

(Continued)

*Primary Examiner* — Richard Reinhardt
(74) *Attorney, Agent, or Firm* — Foley & Lardner LLP; John D. Lanza (57) ABSTRACT

Accentuating terms of interest in an advertisement to be served in an interactive environment. Such terms of interest can be determined from information in a request for the advertisement. Such ad request information may include query information, geolocation information, etc. In the context of text-based ads, accentuation may include bolding the term(s), underlining the term(s), increasing the font size of the term(s), coloring the font of the term(s), shading the font of the term(s), flashing the text of the term(s), etc. Such accentuation helps users to quickly identify how an advertisement is related to what they are looking for. For example, in the context of a search engine which returns search results, as well as multiple text-based ads, users viewing a search result page in response to their query can quickly scan such a search result page for relevant information. This helps to improve the performance of ads, particularly if advertisers wordsmith their advertisements with care.

2 Claims, 5 Drawing Sheets

(56) References Cited

U.S. PATENT DOCUMENTS

| | | | |
|---|---|---|---|
| 6,839,702 B1* | 1/2005 | Patel et al. ................. 707/3 |
| 2002/0026359 A1 | 2/2002 | Long et al. |
| 2002/0032677 A1 | 3/2002 | Morgenthaler et al. |
| 2002/0054167 A1 | 5/2002 | Hugh |
| 2002/0089551 A1 | 7/2002 | Hugh et al. |
| 2002/0099605 A1 | 7/2002 | Weitzman et al. |
| 2002/0133404 A1 | 9/2002 | Pedersen |
| 2002/0169835 A1 | 11/2002 | Paul, Jr. et al. |
| 2003/0036949 A1 | 2/2003 | Kaddeche et al. |
| 2003/0046148 A1 | 3/2003 | Rizzi et al. |
| 2003/0046307 A1 | 3/2003 | Rivette et al. |
| 2003/0076352 A1 | 4/2003 | Uhlig et al. |
| 2003/0078928 A1 | 4/2003 | Dorosario et al. |
| 2003/0117434 A1 | 6/2003 | Hugh |
| 2003/0126136 A1 | 7/2003 | Omoigui |
| 2003/0137536 A1 | 7/2003 | Hugh |
| 2003/0227487 A1 | 12/2003 | Hugh |
| 2003/0233656 A1 | 12/2003 | Sie et al. |
| 2004/0006478 A1 | 1/2004 | Alpdemir et al. |
| 2004/0019499 A1 | 1/2004 | Murashita |
| 2004/0030741 A1 | 2/2004 | Wolton et al. |
| 2004/0059625 A1 | 3/2004 | Schrader |
| 2004/0068436 A1 | 4/2004 | Boubek et al. |

OTHER PUBLICATIONS

Sarah J Heim. Ask Jeeves adds advertisers. Adweek. Apr. 30, 2001. vol. 42, Iss. 18; p. A 1.*

Business Editors/High-Tech Writers. Google's Targeted Keyword Ad Program Shows Strong Momentum With Advertisers; Google Delivers Advertisers Click-Through Rates Four Times Higher Than Industry Averages. Business Wire. Aug. 16, 2000. p. 1.*

The Internet Archive Way Back Machine links.☐☐http://archive.bibalex.org/web/20010117023000/gobi.google.com/jobs.html☐☐.* http://archive.ibalex.org/web/20010111233600/gobi.google.com/intl/en_extra/ads/index.html.* http://web.archive.org/web/19991013145513/altavista.com/av/content/help_advanced.htm.* http://web.archive.org/web/19991012212816/altavista.com/av/avie5/hostsearch.html.*

* cited by examiner

ACCENTUATING TERMS OR FEATURES OF INTEREST IN AN ADVERTISEMENT

1. BACKGROUND OF THE INVENTION

1.1 Field of the Invention

The present invention concerns advertising. In particular, the present invention concerns how ads are to be presented to their audience.

1.2 Related Art

Advertising using traditional media, such as television, radio, newspapers and magazines, is well known. Advertisers have used these types of media to reach a large audience with their advertisements ("ads"). To reach a more responsive audience, advertisers have used demographic studies. For example, advertisers may use broadcast events such as football games to advertise beer and action movies to a younger male audience. Similarly, advertisers may use magazines that reach a relatively affluent readership to advertise luxury items such as expensive watches and luxury automobiles. However, even with demographic studies and entirely reasonable assumptions about the typical audience of various media outlets, advertisers recognize that much of their ad budget is simply wasted. Unfortunately, it is very difficult to identify and eliminate such waste.

Recently, advertising over more interactive media has become popular. For example, as the number of people using the Internet has exploded, advertisers have come to appreciate media and services offered over the Internet as a potentially powerful way to advertise.

Advertisers have developed several strategies in an attempt to maximize the value of such advertising. In one strategy, advertisers use popular presences or means for providing interactive media or services (referred to as "Web sites" in the specification without loss of generality) as conduits to reach a large audience. Using this first approach, an advertiser may place ads on the home page of the New York Times Web site, or the USA Today Web site, for example. In another strategy, an advertiser may attempt to target its ads to more narrow niche audiences, thereby increasing the likelihood of a positive response by the audience. For example, an agency promoting tourism in the Costa Rican rainforest might place ads on the ecotourism-travel subdirectory of the Yahoo Web site.

Regardless of the strategy, Web site-based ads (also referred to as "Web ads") are typically presented to their advertising audience in the form "banner ads"—i.e., a rectangular box that includes graphic components. When a member of the advertising audience (referred to as a "viewer" in the Specification without loss of generality) selects one of these banner ads by clicking on it, embedded hypertext links typically direct the viewer to the advertiser's Web site. This process, wherein the viewer selects an ad, is commonly referred to as a "click-through". The ratio of the number of click-throughs to the number of impressions of the ad (i.e., the number of times an ad is displayed) is commonly referred to as the "click-through rate" of the ad.

Despite the initial promise of Web site-based advertisement, there remain several problems with existing approaches. Although advertisers are able to reach a large audience, they are frequently dissatisfied with the return on their advertisement investment. Some have attempted to improve ad performance by tracking the online habits of users, but this approach has led to privacy concerns.

Accordingly, it is desired to improve the performance of ads, such as ads used in an interactive environment.

2. SUMMARY OF THE INVENTION

The present invention helps to improve the performance of ads to be served in an interactive environment by accentuating terms of interest in the ads. Such terms of interest can be determined from information in a request for the advertisement. In one embodiment of the invention, such ad request information may include query information, geolocation information, etc. In the context of text-based ads, accentuation may include bolding the term(s), underlining the term(s), increasing the font size of the term(s), coloring the font of the term(s), shading the font of the term(s), flashing the text of the term(s), etc.

4. DETAILED DESCRIPTION

The present invention may involve novel methods, apparatus, message formats and/or data structures for increasing the performance (e.g., in terms of click-through rates) of advertisements in an interactive environment. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventor regards her invention as the following disclosed methods, apparatus, message formats and data structures and any other patentable subject matter.

In the following, environments in which the present invention may operate are described in §4.1. Then, exemplary embodiments of the present invention are described in §4.2. Thereafter, an example of operations in an exemplary embodiment is provided in §4.3 Finally, some conclusions regarding the present invention are set forth in §4.3.

4.1 ENVIRONMENTS IN WHICH, OR WITH WHICH, THE PRESENT INVENTION MAY OPERATE

4.1.1 Exemplary Advertising Environment

Figure 1:
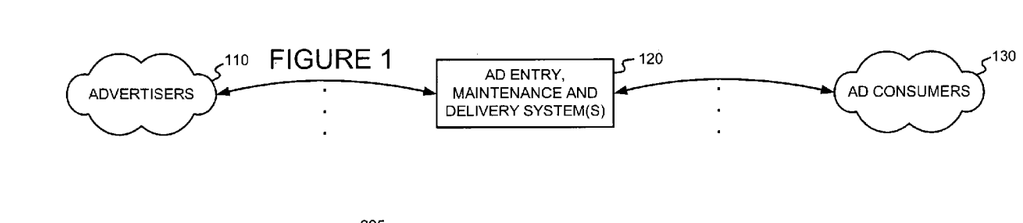
FIG. 1 is a high-level diagram showing parties or entities that can interact with an advertising system.

FIG. 1 is a high level diagram of an advertising environment. The environment may include an ad entry, maintenance and delivery system 120. Advertisers 110 may directly, or indirectly, enter, maintain, and track ad information in the system 120. The ads may be in the form of graphical ads such as so-called banner ads, text only ads, text-based ads, audio ads, video ads, ads combining various media types, etc. Ad consumers 130 may submit requests for ads to, accept ads responsive to their request from, and provide historical or usage information to, the system 120. Although not shown, other entities may provide historical or usage information (e.g., whether or not a conversion related to the ad occurred) to the system 120.

One example of an ad consumer 130 is a general content server which receives requests for content (e.g., articles, discussion threads, music, video, graphics, search results, web page listings, etc.), and retrieves the requested content in response to, or otherwise services, the request. The content server may submit a request for ads to the system 120. Such an ad request may include a number of ads desired. The ad request may also include content request information. This information may include the content itself (e.g., page), a category corresponding to the content or the content request (e.g., arts, business, computers, arts-movies, arts-music, etc.), part or all of the content request, content age, content type (e.g., text, graphics, video, audio, mixed media, etc.), geolocation information, etc.

The content server may combine the requested content with one or more of the advertisements provided by the system 120. This combined information including the content and advertisement(s) is then forwarded towards the end user that requested the content, for presentation to that user. Finally, the content server may transmit information about the ads and how the ads are to be rendered (e.g., position, click-through or not, impression time, impression date, size, conversion or not, etc.) back to the system 120. Alternatively, or in addition, such information may be provided back to the system 120 by some other means.

Another example of an ad consumer 130 is a search engine. A search engine may receive queries for search results. In response, the search engine may retrieve relevant search results (e.g., from an index of Web pages). An exemplary search engine is described in the article S. Brin and L. Page, "The Anatomy of a Large-Scale Hypertextual Search Engine," *Seventh International World Wide Web Conference*, Brisbane, Australia (incorporated herein by reference). Such search results may include, for example, lists of Web page titles, snippets of text extracted from those Web pages, and hypertext links to those Web pages, and may be grouped into a predetermined number of (e.g., ten) search results.

The search engine may submit a request for ads to the system 120. The request may include a number of ads desired. This number may depend on the search results, the amount of screen or page space occupied by the search results, the size and shape of the ads, etc. In one embodiment, the number of desired ads will be from one to ten, and preferably from three to five. The request for ads may also include the query (as entered or parsed), information based on the query (such as geolocation information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores such as dot products of feature vectors corresponding to a query and a document, Page Rank scores, and/or combinations of IR scores and Page Rank scores), snippets of text extracted from identified documents (e.g., WebPages), full text of identified documents, feature vectors of identified documents, etc.

Figure 3:
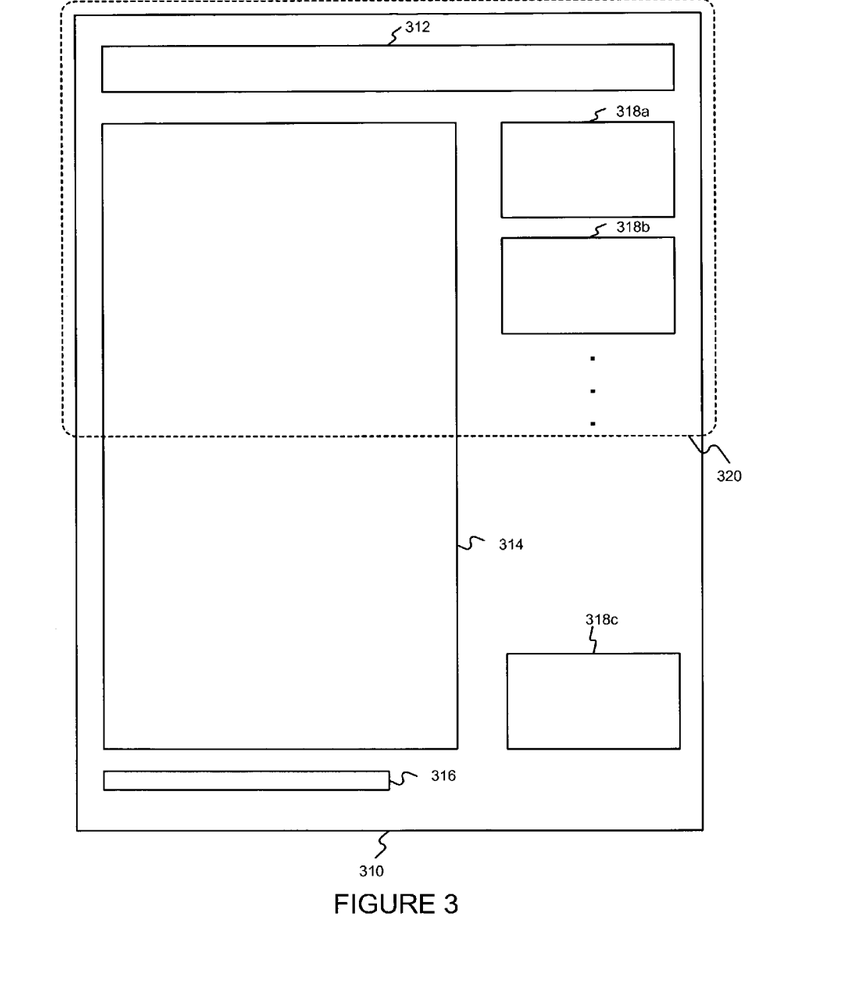
FIG. 3 is a block diagram of a Web page that may be generated by a page assembly operation of an ad consumer, for rendering on a viewer's screen.

The search engine may combine the search results with one or more of the advertisements provided by the system 120. This combined information including the search results and advertisement(s) is then forwarded towards the user that requested the content, for presentation to the user. For example, FIG. 3 is an abstract illustration of a display page 310 that may be provided by the search engine. The outline 320 depicted with dashed lines corresponds to a portion of the display page 310 that may be viewed on a typical personal computer display screen at a typical resolution. The exemplary display page 310 may include header information 312 (e.g., the name of search engine host), trailer information 316 (e.g., copyright, navigational hypertext links, etc.), a plurality of search results 314 and a plurality of ads 318a, 318b, and 318c. The search results 314 are maintained as distinct from the ads 318, so as not to confuse the user between paid advertisements and presumably neutral search results. Although FIG. 3 shows only three ads 318, embodiments consistent with the principles of the present invention may have more or less ads. For example, ten search results combined with ten ads has been found to be effective.

Finally, the search engine may transmit information about the ad and how the ad was to be rendered (e.g., position, click-through or not, impression time, impression date, size, conversion or not, etc.) back to the system 120. Alternatively, or in addition, such information may be provided back to the system 120 by some other means.

4.1.2 Exemplary Ad Entry, Maintenance and Delivery Environment

Figure 2:
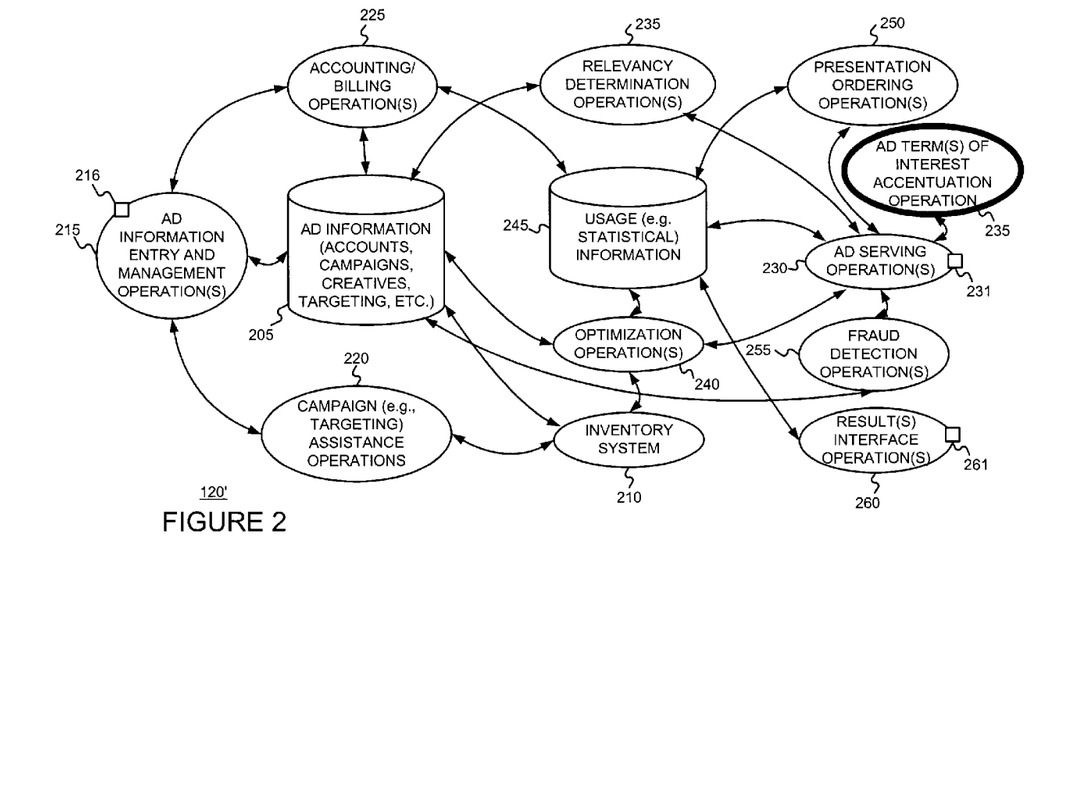
FIG. 2 is a bubble chart of an advertising environment in which, or with which, the present invention may operate.

FIG. 2 illustrates an exemplary ad system 120' with which, or in which, the present invention may be used. The exemplary ad system 120' may include an inventory system 210 and may store ad information 205 and usage or historical (e.g., statistical) information 245. The exemplary system 120' may support ad information entry and management operation(s) 215, campaign (e.g., targeting) assistance operation(s) 220, accounting and billing operation(s) 225, ad serving operation(s) 230, relevancy determination operation(s) 235, ad term(s) of interest accentuation operation(s) 239, optimization operations 240, presentation ordering operations 250, fraud detection operation(s) 255, and result(s) interface operation(s) 260. Advertisers 110 may interface with the system 120' via the ad information entry and management operation(s) 215 as indicated by interface 216. Ad consumers 130 may interface with the system 120' via the ad serving operation(s) 230 as indicated by interface 231. Ad consumers 130 or other entities (not shown) may also interface with the system 120' via results interface operation(s) 260 as indicated by interface 261.

In one embodiment of the exemplary ad system 120', an advertising program includes information concerning accounts, campaigns, creatives, targeting, etc. The term "account" relates to information for a given advertiser (e.g., a unique email address, a password, billing information, etc.). A "campaign" or "ad campaign" refers to a one or more groups of one or more advertisements, and may include a start date, an end date, budget information, geo-targeting information, syndication information, etc. For example, Honda may have one advertising campaign for its automobile line, and a separate advertising campaign for its motorcycle line. The campaign for its automotive line have one or more ad groups, each containing one or more ads. Each ad group may include a set of keywords, and a (e.g. maximum) cost bid (cost per click-though, cost per conversion, etc.). As stated, each ad group may have one or more ads or "creatives" (That is, ad content that is ultimately rendered to an end user.).

The ad information 205 can be entered and managed via the ad information entry and management operation(s) 215. Campaign (e.g., targeting) assistance operation(s) 220 can be employed to help advertisers 110 generate effective ad campaigns. The campaign assistance operation(s) 220 can use information provided by the inventory system 210, which, in the context of advertising for use with a search engine, may track all possible ad impressions, ad impressions already reserved, and ad impressions available for given keywords. The ad serving operation(s) 230 may service requests for ads from ad consumers 130. The ad serving operation(s) 230 may use relevancy determination operation(s) 235 to determine candidate ads for a given request. The ad serving operation(s) 230 may then use optimization operation(s) 240 to select a final set of one or more of the candidate ads. The ad serving operation(s) 230 may use presentation ordering operation(s) 250 to order the presentation of the ads to be returned. The fraud detection operation(s) 255 can be used to reduce fraudulent use of the advertising system (e.g., by advertisers), such as through the use of stolen credit cards. The result(s) interface operation(s) 260 may be used to accept result information (from the ad consumers 130 or some other entity) about an ad actually served, such as whether or not click-through occurred, whether or not conversion occurred (e.g., whether the sale of an advertised item or service was initiated or consummated within a predetermined time from the rendering of the ad), etc. Such result(s) information may be accepted at interface 261 and may include information to identify the ad and time the ad was served, as well as the associated result.

The ad term(s) of interest accentuation operation(s) 239 may be used by the ad serving operation(s) 230 to accentuate content of the ad that may be considered to be of particular interest to the end user to which the ad will be rendered. The principles of the present invention may be applied to such an ad interest accentuation operation 239.

4.2 EXEMPLARY EMBODIMENTS

4.2.1 Exemplary Method

Figure 4:
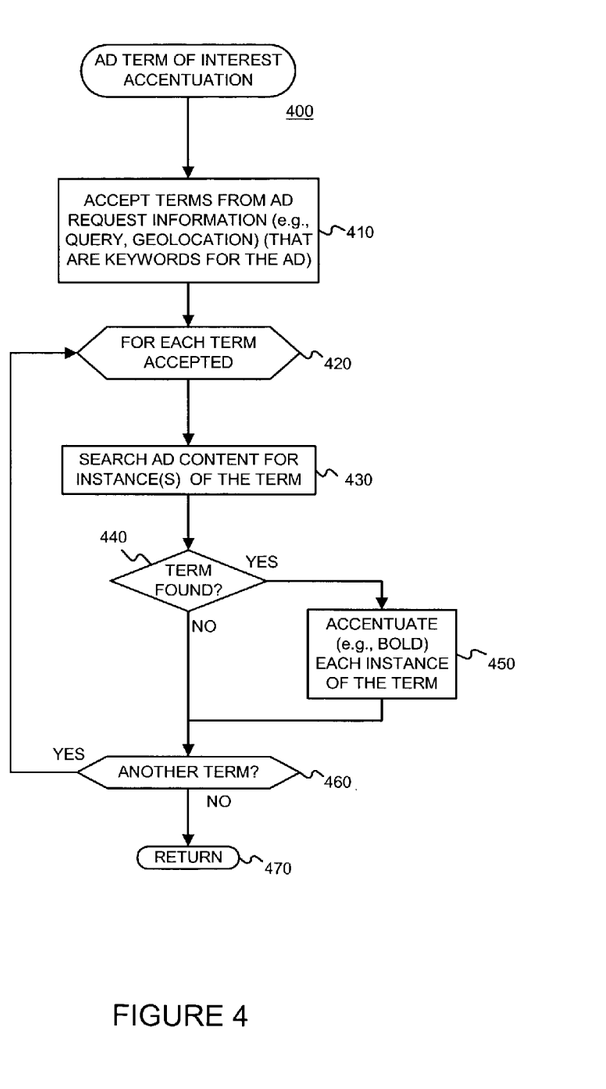
FIG. 4 is a flow diagram of an exemplary method that may be used to perform an ad term(s) of interest accentuation operation in an environment such as that of FIG. 2.

FIG. 4 is a flow diagram of an exemplary method 400 that may be used to perform ad term(s) of interest accentuation operation(s) 239. As shown, terms from ad request information is accepted (block 410). Ad request information is intended to be any information included in, or associated with, an ad request. Content request information, such as a query in the context of a request for search results, is an example of ad request information. More specifically, in the context of the exemplary search engine environment described above, terms from ad request information may be terms (preferably not stop words) from the query submitted to the search engine. The query may have been preprocessed to, for example, parse the query, remove so-called "stop words," determine the roots of words, etc. Ad request information is not limited to the content of the query. For example, if geolocation information is provided or associated with the query, a term may be the geolocation or proper place names within the geolocation. For example, if a query originated from a source in San Jose, Calif., the terms may include "San Jose" and "California". In one embodiment of the present invention, the terms are limited to keywords associated with the ad.

As indicated by the loop defined by blocks 420 and 460, the acts within the loop may be performed for each of the terms accepted. More specifically, for each term accepted, the ad content (or a portion or portions of the ad content) is searched for one or more instances of the term (block 430). If the term is found in the content of the ad, each instance of the term is accentuated (or encoded such that it will be accentuated when rendered to the end user) (decision block 440 and block 450). Alternatively, only some instances of the term will be accentuated.

Term "accentuation" is a broad concept, and its meaning may depend upon the ad content and how the ad is to be rendered. For example, if the ad is a text ad, accentuation may mean bolding the term(s), italicizing the term(s), underlining the term(s), highlighting the term(s), coloring the term(s), shading the term(s), flashing the term(s), and/or increasing the font size of the term(s), etc. If the ad is an audio ad, accentuation may mean increasing the volume of the term(s), changing the cadence of the term(s), changing the pitch of the term(s), changing the pronunciation of the term(s), etc.

When all of the accepted terms have been processed, the method 400 is left via RETURN node 470. Note, however, that in another embodiment of present invention, accentuation could be limited to a predetermined number of terms and/or to a predetermined type or types of terms.

4.2.2 Exemplary Apparatus and Data Structures

Figure 5:
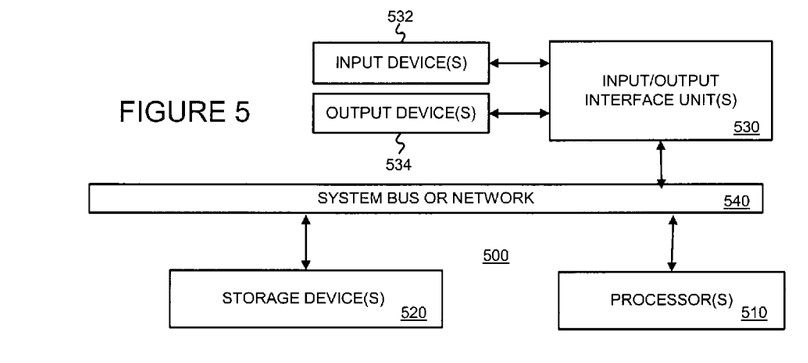
FIG. 5 is a high-level block diagram of apparatus that may be used to perform at least some of the various operations that may be performed consistent with the principles of the present invention.

FIG. 5 is high-level block diagram of a machine 500 that may perform one or more of the operations discussed above. The machine 500 basically includes a processor(s) 510, an input/output interface unit(s) 530, a storage device(s) 520, and a system bus or network 540 for facilitating the communication of information among the coupled elements. An input device(s) 532 and an output device(s) 534 may be coupled with the input/output interface(s) 530.

The processor(s) 510 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to perform one or more aspects of the present invention. At least a portion of the machine executable instructions may be stored (temporarily or more permanently) on the storage device(s) 520 and/or may be received from an external source via an input interface unit 530.

In one embodiment, the machine 500 may be one or more conventional personal computers. In this case, the processing unit(s) 510 may be one or more microprocessors. The bus 540 may include a system bus. The storage devices 920 may include system memory, such as read only memory (ROM) and/or random access memory (RAM). The storage device(s) 520 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 532, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 510 through an appropriate interface 530 coupled to the system bus 540. However, in the context of the ad term(s) of interest accentuation operation(s) 239, no input devices, other than those needed to accept data, and possibly those for system administration and maintenance, are needed.

The output device(s) 534 may include a monitor or other type of display device, which may also be connected to the system bus 540 via an appropriate interface. In addition to (or instead of) the monitor, the personal computer may include other (peripheral) output devices (not shown), such as speakers and printers for example. Again, in the context of ad term(s) of interest accentuation operation(s) 239, no output devices, other than those needed to output billing information, and possibly those for system administration and maintenance, are needed.

Figure 6:
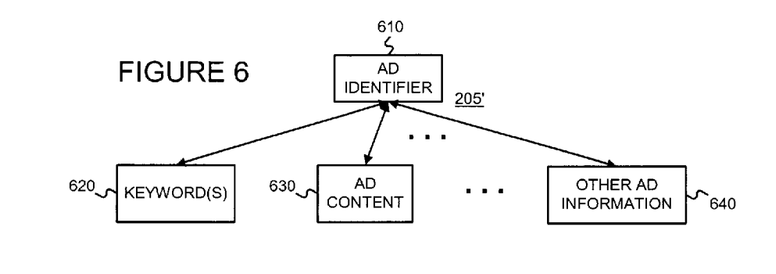
FIG. 6 is a block diagram illustrating exemplary data structures that may be used to store ad information.

FIG. 6 illustrates a relationship among ad identification information 610, keyword(s) 620, ad content 630, and other ad information 640. Various data structures for associating such information are possible. In one embodiment, the ad identifier 610 may be unique and therefore used as a "primary key" to associate various pieces of information. As stated above with reference to the method 400 of FIG. 4, the term(s) of interest that may be subject to accentuation may be limited to keyword(s) 620 associated with the ad.

4.3 EXAMPLE OF OPERATION OF AN EXEMPLARY EMBODIMENT

Figure 7:
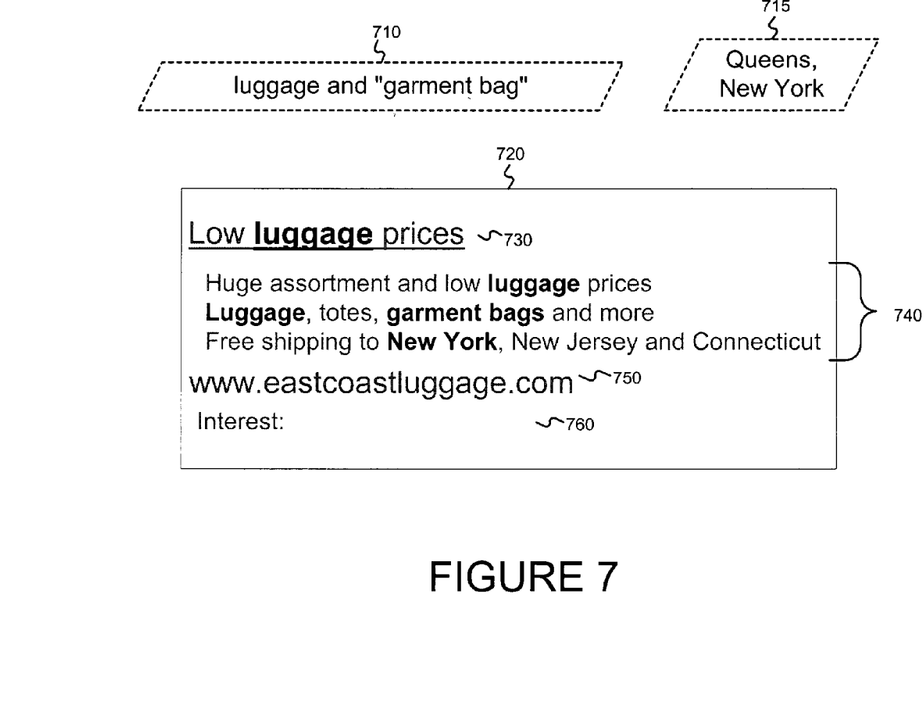
FIG. 7 is an example which illustrates one application of the principles of the present invention in the context of a text-based ad served in response to a query from a particular geolocation.

FIG. 7 is an example which illustrates the operation of an exemplary embodiment of the present invention as applied to text-based ads that may be used in the context of a search engine. The query:

luggage and "garment bag"

is shown in block 710. The geolocation of the origin of the query 710 may also be known. Here, block 715 indicates that the origin of the query 710 is:

Queens, N.Y.

Referring back to FIG. 3, the search engine may return search results 314 and text-based ads 312 and 318. One of the ads 318 may have a format similar to 720, including a title line 730, a textual body 740, a World Wide Web address 750, and an interest level indicator 760.

In the example illustrated in FIG. 7, note that the term "luggage", found in the query 710, is accentuated, using bold typeface, in the ad 720. However, that not all instances of luggage need be accentuated, as can be seen in the text of the World Wide Web address 750. Note also that the term "garment bag", a form of which is found in the query 710, is also accentuated, using bold typeface, in the ad 720. Note that although the term "and" appears in both the text 740 and the query 710, it is not accentuated because it is a so-called "stop word". Finally, note that the term "New York", found in the geolocation information 715, is also accentuated, using bold typeface, in the ad 720. Such bolding may be generated by adding <b></b> HTML tags between terms in the ad that correspond to terms found in the query information 710,715.

Referring to both FIGS. 3 and 7, as can be appreciated, when there are multiple ads 318 on a given screen view, the illustrated embodiment of the present invention helps an end user to quickly identify how the ad is related to what they are looking for.

4.4 CONCLUSIONS

As can be appreciated from the foregoing disclosure, the present invention helps users to quickly identify how an advertisement is related to what they are looking for. For example, in the context of a search engine which returns search results, as well as multiple text-based ads, users viewing a search result page in response to their query can quickly scan such a search result page for relevant information. In so doing, the present invention can help improve the performance of ads, particularly if advertisers wordsmith their advertisements with care.

What is claimed is:

1. A computer-implemented method, comprising:
   a) accepting, with an ad serving system, a first term and a second term from advertisement request information, the first term comprising content entered by a user in connection with a user request and the second term comprising geolocation information related to the user request but not included in the content;
   b) selecting one or more audio-based advertisements from a plurality of advertisements for presentation with a set of search results, the search results being responsive to the user request, wherein the plurality of advertisements each comprise at least one keyword and at least one set of content, the one or more audio-based advertisements being selected based on an association with at least one of the first term and the second term;
   c) searching, with the ad serving system, the at least one set of content of the one or more selected audio-based advertisements, for the first term and the second term;
   d) accentuating, with the ad serving system, one or more instances of each of the first term and the second term that were found in the one or more selected audio-based advertisements to generate information for rendering one or more audio accentuated advertisements, wherein at least one instance of the first term or the second term is not accentuated in the one or more selected audio-based advertisements; and
   e) serving, with the ad serving system, the generated information for rendering the one or more audio accentuated advertisements along with the set of search results for presentation to the user associated with the user request,
   wherein the act of accentuating the one or more instances uses a type of accentuation selected from a group of accentuation types consisting of: (A) increasing a volume of the term, (B) changing a cadence of the term, (C) changing a pitch of the term, and (D) changing a pronunciation of the term.

2. An apparatus, comprising:
   a) an input for accepting a first term and a second term from advertisement request information, wherein the first term comprises content entered by a user in connection with a user request and the second term comprises geolocation information related to the user request but not included in said content;
   b) at least one processor; and
   c) at least one storage device storing processor executable instructions which, when executed by the at least one processor, perform a method of:
   1) selecting an audio-based advertisement from a plurality of advertisements for presentation with a set of search results, the search results being responsive to the user request, wherein the plurality of advertisements each comprise at least one keyword and at least one set of content, wherein the selected audio-based advertisement is based on an association with at least one of the first term and the second term;
   2) searching the at least one set of content of the selected audio-based advertisement, for the first term and the second term,
   3) accentuating one or more instances of the first term and the second term that were found in the selected audio-based advertisement to generate information for rendering an accentuated audio-based advertisement, wherein at least one instance of the first term or the second term is not accentuated in the one or more selected audio-based advertisements, and 4) serving the generated information for rendering the accentuated audio-based advertisement along with the set of search results for presentation to the user associated with the user request;

and wherein the act of accentuating the one or more instances of the uses a type of accentuation selected from a group of accentuation types consisting of (A) increasing a volume of the term, (B) changing a cadence of the term, (C) changing a pitch of the term, and (D) changing a pronunciation of the term.

\* \* \* \* \*